(12) United States Patent
Bernhuber et al.

(10) Patent No.: US 10,316,445 B2
(45) Date of Patent: Jun. 11, 2019

(54) EXTENSIBLE NON-WOVEN, METHOD FOR PRODUCING AN EXTENSIBLE NON-WOVEN AND USE OF SAME

(71) Applicant: Sandler AG, Schwarzenbach (DE)

(72) Inventors: Uwe Bernhuber, Hof (DE); Alexander Obermoser, Berg (DE)

(73) Assignee: SANDLER AG, Schwarzenbach (DE)

( * ) Notice: Subject to any disclaimer, the term of this patent is extended or adjusted under 35 U.S.C. 154(b) by 95 days.

(21) Appl. No.: 15/226,645

(22) Filed: Aug. 2, 2016

(65) Prior Publication Data

US 2017/0037551 A1 Feb. 9, 2017

(30) Foreign Application Priority Data

Aug. 3, 2015 (DE) .................. 10 2015 010 105

(51) Int. Cl.
| | |
|---|---|
| *D04H 1/49* | (2012.01) |
| *D04H 13/00* | (2006.01) |
| *D04H 1/492* | (2012.01) |
| *D04H 1/541* | (2012.01) |
| *B32B 5/02* | (2006.01) |

(52) U.S. Cl.
CPC ............ *D04H 13/00* (2013.01); *B32B 5/022* (2013.01); *D04H 1/49* (2013.01); *D04H 1/492* (2013.01); *D04H 1/541* (2013.01); *B32B 2307/51* (2013.01); *B32B 2555/00* (2013.01); *D10B 2401/061* (2013.01)

(58) Field of Classification Search
CPC .... D04H 13/00; B32B 5/022; B32B 2307/51; B32B 2555/00; D10B 2401/061
See application file for complete search history.

(56) References Cited

U.S. PATENT DOCUMENTS

| | | | | |
|---|---|---|---|---|
| 5,240,764 A | * | 8/1993 | Haid ................. | A47L 13/16 28/104 |
| 5,334,446 A | * | 8/1994 | Quantrille ............ | D01G 25/00 442/35 |
| 7,008,889 B2 | | 3/2006 | Black et al. | |
| 2011/0311795 A1 | * | 12/2011 | Bartl .................. | B32B 5/26 428/219 |

FOREIGN PATENT DOCUMENTS

| | | |
|---|---|---|
| DE | 69121694 T2 | 8/1996 |
| WO | 03/078717 A1 | 9/2003 |

\* cited by examiner

*Primary Examiner* — Jeremy R Pierce
(74) *Attorney, Agent, or Firm* — Fox Rothschild LLP

(57) ABSTRACT

The invention relates to an extensible non-woven, in particular, cover sheet material for a multi-layer laminate comprising hydroentangled staple fibers, where the non-woven contains 5 to 25 wt % of binder fibers made of thermoplastic material, in particular 10-15 wt % of binder fibers, and is in addition to hydroentanglement thermally bonded. Furthermore, the invention relates to an elastic multi-layer laminate for use in an elastic component for personal hygiene products composed of elastic base material covered on one or both sides by cover material, where the cover material is formed from extensible non-woven fabric.

5 Claims, 2 Drawing Sheets

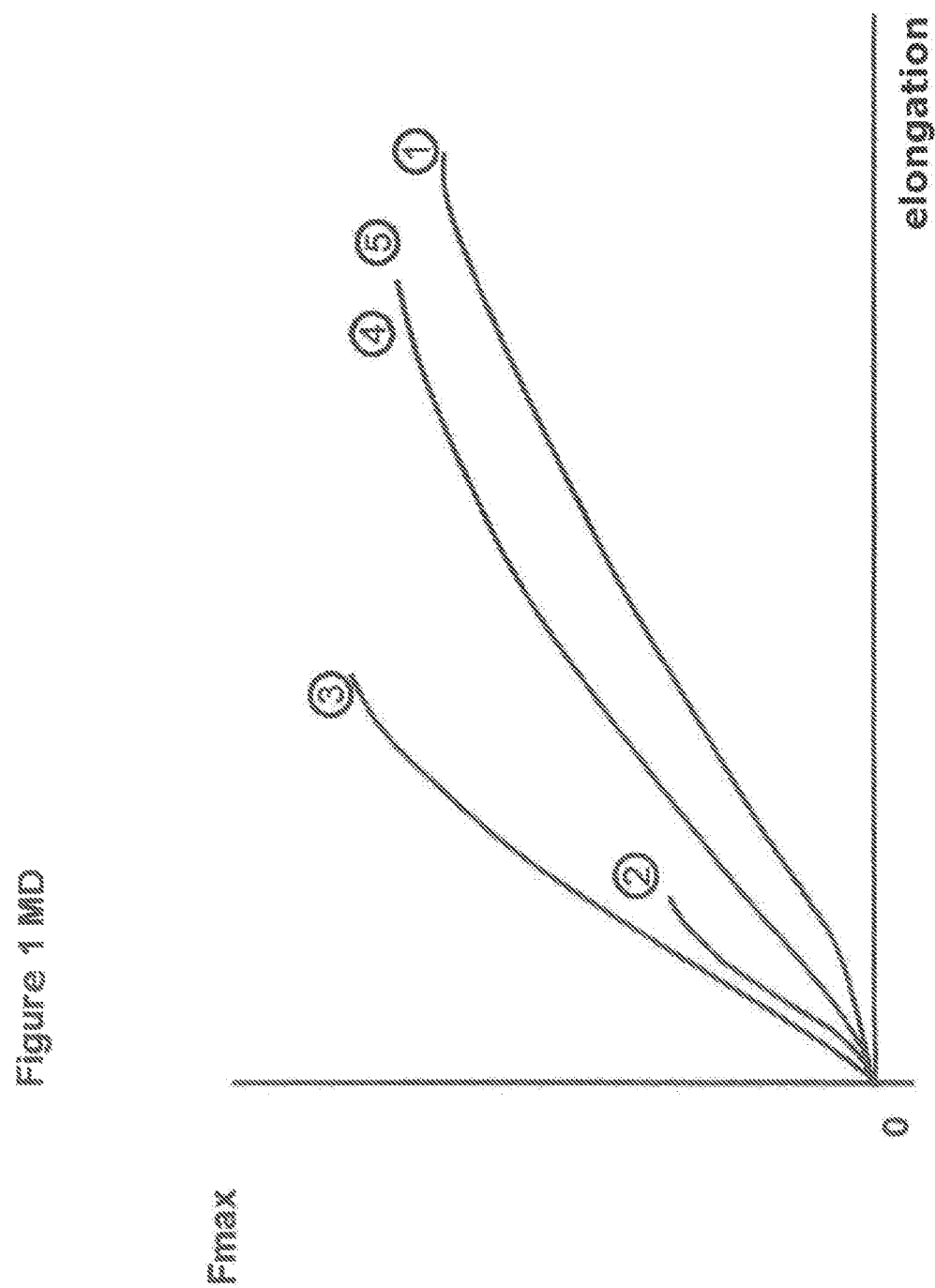

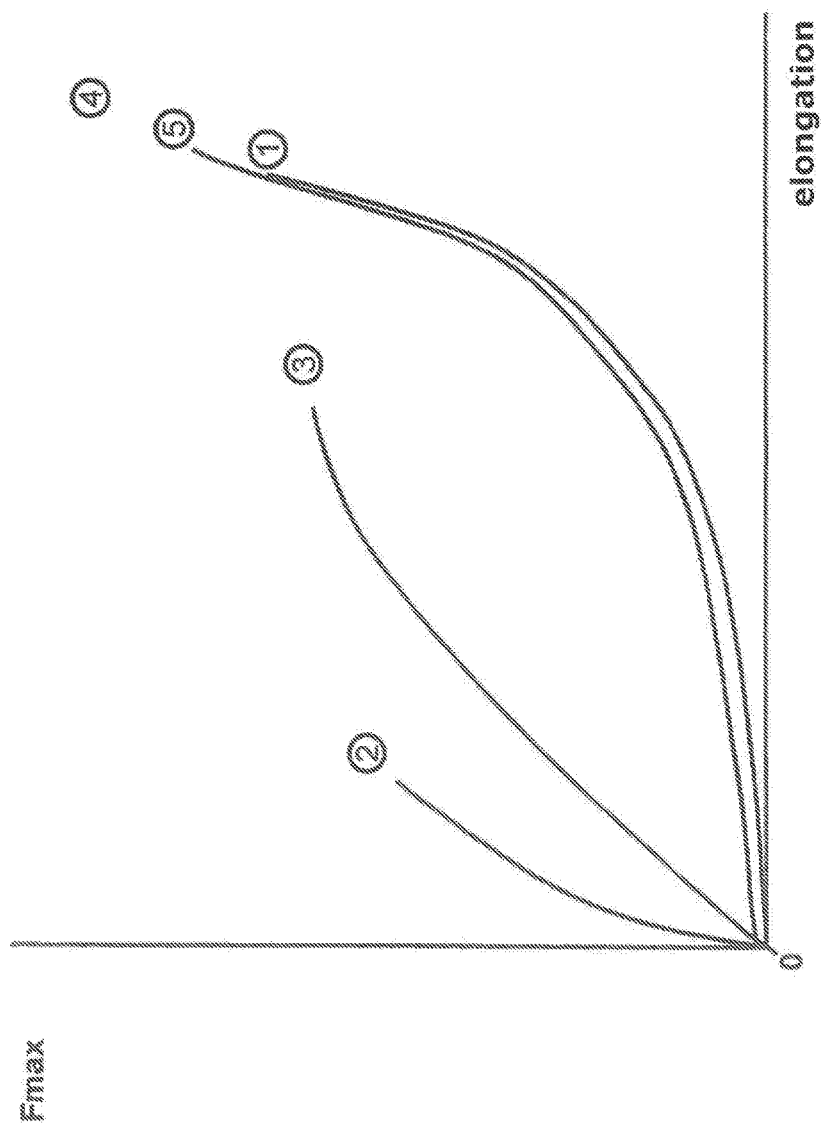

EXTENSIBLE NON-WOVEN, METHOD FOR PRODUCING AN EXTENSIBLE NON-WOVEN AND USE OF SAME

CROSS-REFERENCE TO RELATED APPLICATIONS

The present application claims priority benefit to German Patent Application No. 102015010105.6, filed on Aug. 3, 2015. The disclosure of the foregoing application is incorporated herein by reference in its entirety.

BACKGROUND OF THE INVENTION

The present invention relates to extensible non-wovens, such as those used, for example, as components in elastic components for personal hygiene products such as diapers and pants. The invention in particular relates to extensible non-wovens using hydroentangled staple fibers, a method for producing respective non-wovens and an elastic multi-layer laminate using the non-woven.

Elastic components for personal hygiene products comprise, for example, a diaper ear attached to the diaper chassis. Located on the diaper waistband is the so-called landing zone. This is the counterpart to which the hook material gets caught mechanically when closing the diaper. The diaper ear is according to prior art composed of a multi-layer laminate which is according to prior art fixed thermally or by way of ultrasound to one side to the diaper chassis at the rear. Furthermore, hook material is also attached thermally at the open side of the ear facing the diaper waistband.

To increase wearing comfort and fit, these laminates contain elastic components, frequently films which after closing the diaper allow adaptation of the diaper waistband to the body shape due to the restoring force of the plastic portion. In order to provide the user with an appealing haptic feel, the elastic components are frequently on one or on both sides covered with textile cover sheets made of non-woven.

Tests have shown that the user when closing a diaper requires a force on the diaper ear in the range of max. 10N. The tensile force is there commonly in the range of 0-100%. After loss of the tensile force, the diaper ear must again largely restore shape due to its elasticity. This range between 0 to 10N force and 0-100% elongation is also referred to as the functional region.

Materials suitable for this are mostly composed of a laminate in which an elastic layer is at least on one side covered with a cover sheet. The bond between the layers can there be effected by way of adhesive or thermal lamination.

The following requirements therefore arise for a suitable cover sheet:
a. slight inclination of the force-elongation curve in the functional region when loading in the transverse direction
b. longitudinal stability, so that only a small width change occurs during processing
c. few process steps in the diaper ear production
d. no shedding fibrous material during use
e. low dust formation during processing
f. stop function for preventing overstretching
g. low thickness to realize economic roll run times
h. sufficient thermal sealing to ensure good bonding strength to the chassis of the diaper or pants and the hooks.

The systems in principle established in the market are described, for example, in the article "Performance and Fit" by the authors Dr. Hornfeck and Bernhuber, Non-woven Industry, January 2013 pages 56 to 62. In particular the advantages of hydroentangled non-woven materials are pointed out.

Cover sheets can be composed, for example, of thermally calendar-entangled staple fiber non-wovens. EP 2069141 B1 is there generic. An activatable zero strain composite laminate web is known from this document, comprising an activatable elastic laminate web and at least one pre-bonded staple fiber non-woven web. The activatable elastic laminate web comprises an elastic core layer and a skin layer which is less elastic than the core layer. The staple fiber non-woven web is attached to one of the skin layers of the elastic laminate web and has an elongation at fracture of at least 100% in the cross-direction. The activatable elastic laminate web forms an essentially homogeneous microtextured surface when stretched in the first upload past the elastic limit of the one or more skin layers.

Characteristic for such staple fiber non-wovens is a force-elongation behavior in MD and CD as shown in FIGS. 1 and 2. The bonding area in the calender is between 8 and 22%. Due to this thermal bonding, the portion of fibers corresponding to the bonding area is in the non-woven melted to each other and thereby fixed in the non-woven composite. Such non-wovens have sufficient stability in the longitudinal direction despite good extendibility in the transverse direction so that product stress fluctuations in the longitudinal direction have little effect on the width. Such non-wovens are therefore also thin enough to produce large roll lengths, which has a positive effect on the efficiency of further processing.

A drawback of staple fiber non-wovens thus produced is that they build up a force-elongation curve in CD in the functional region of the diaper ear that is too steep as compared to the elastic component, which is by the user perceived as being negative.

Laminates using staple fiber non-wovens that are thermally calendar bonded are in an additional process step commonly activated. This activation represents an overelongation of the material in the transverse direction with the purpose to break up a large part of the existing bindings so that the force to be exerted in subsequent use to stretch the diaper ear is as low as possible. This activation takes place in the laminated state, i.e. together with the elastic component, but can also take place beforehand. A drawback is that these non-wovens are there damaged in their structure such that the fibers forming the non-woven are no longer completely held in the non-woven. As a result, the fibers can escape from the non-woven and be shed; delamination is also possible. Furthermore, the non-woven contributes no strength-enhancing features to the diaper ear.

It arises based on the above-mentioned requirement profile that thermally calendar-bonded non-wovens do satisfy requirements b, e and g stated above, but doe not satisfy the other requirements.

EP 1921192 B1 describes the use of water-jet bonded filament or staple fiber non-wovens for the same purpose of application. Due to the water-jet bonding, the bonding points of the fibers among each other are not rigidly fixed but are flexible. A force-elongation curve typical for such material is shown in FIG. 1, curve 1. The required activation process can be omitted when using such non-wovens.

The fibers are by water-jet needling reoriented such that the original two-dimensional fiber alignment is converted into a three-dimensional fiber orientation. The fibers are therefore more firmly incorporated into the non-woven and the risk of dust formation during processing or shedding during use is minimized.

The drawback of such hydroentangled non-wovens is that they have a greater thickness than the aforementioned calender-bonded non-wovens. As a result, the rolls have a lower run length which makes more frequent roll changes necessary and results in additional costs. Furthermore, the water-jet bonded non-wovens exhibit a higher elongation in the longitudinal direction of the material as compared to calendar-bonded non-wovens and are therefore harder to process because small fluctuations in web tension already cause width contractions and therefore lead to discharge due to the lack of required width.

The object of the present invention is therefore to avoid the above described drawbacks of prior art.

BRIEF SUMMARY OF THE INVENTION

The present object is satisfied by an extensible non-woven, in particular, cover sheet material for a multi-layer laminate comprising hydroentangled staple fibers, in that the non-woven contains 5 to 25 wt % of binder fibers made of thermoplastic material, in particular 10-15 wt % of binder fibers, and is in addition to hydroentanglement thermally bonded.

Respective material is characterized by a particularly good force-elongation behavior, has good elongation behavior in the transverse direction and is unaffected in particular by processing influences in the longitudinal direction. Due to the use of binder fibers, both fiber entanglements arising during hydroentanglement as well as unbound fibers can be fixated in the fiber composite.

According to a preferred embodiment, the binder fibers may also be staple fibers. Good fiber entanglement is thus ensured by water-jet entanglement.

The extensible non-woven can there have a weight range of 15 to 40 g/square meter.

According to a further preferred embodiment, the fibers can have a titer range of 1.0 dtex to 4.4 dtex, particularly preferably 1.3 to 2.2 dtex. This titer range has been found as being particularly suitable for performing the present invention.

According to another preferred embodiment, staple fibers with two different titer ranges can be contained. The staple fibers can there be made of the same material and have the same fiber length. A very stable extensible non-woven can be obtained due to the use of different titer ranges.

Particularly preferably, the non-woven can contain 40-45 wt % of first staple fibers with 1.3 dtex/40 mm, 40-45 wt % of second staple fibers with 2.2 dtex/40 mm and 10 to 20 wt % of binder fibers with a 2.2 dtex/40 mm. For example, polypropylene has proven particularly suitable as material for the staple fibers.

Another embodiment can provide that the binder fibers are bi-component fibers, in particular bi-component fibers having a sheath/core structure. With respective bi-component fibers, the material of the sheath has a lower melting temperature than the material of the core. The structural stability of the resulting non-woven is thereby additionally enhanced.

The staple fibers are preferably thermoplastic fibers, where the binder fibers have a melting point that is at least 10° C. lower than the other staple fibers. This ensures selective thermal bonding.

According to a preferred embodiment, the extensible non-woven described is used as cover sheet material for an elastic component, in particular a closure system for personal hygiene products. The non-woven according to the invention meets all the requirements demanded of a respective material and can at the same time be produced in a cost-efficient manner.

Regarding the method for producing an extensible non-woven, the present invention provides a method which comprises mixing staple fibers and binder fibers, carding the fibers to produce a non-woven, performing hydroentanglement and subsequently drying with hot air to remove excess water, where the binder fibers are during the drying process activated and thermally bonded. The method according to the invention is particularly simple to perform as thermal bonding is performed during the drying step that is necessary anyway, so that any additional process steps can be dispensed with. The process time is at the same time not extended so that the overall costs can be reduced.

Furthermore, the invention relates to an elastic multi-layer laminate for use in an elastic component for personal hygiene products composed of elastic base material covered on one or both sides by cover material, where the cover material is formed from extensible non-woven fabric as defined above. It has been found that the non-woven according to the invention very well satisfies all requirements regarding appropriate cover material.

The terms and testing methods used in the text below are defined as follows:

The terms "fiber and staple fiber" are throughout this specification used synonymously. They describe synthetically produced fiber materials having a defined cut length given in mm and a defined fiber diameter also referred to as titer and given in dtex. If fibers from synthetic polymers are used, then polypropylene, polyester, polyamide, polyethylene, polylactide, but also viscose, Tencel (trade name of Lenzing AG) can be used without this being limited to these materials. Usually, fibers in the titer range of 1.0 dtex to 4.4 dtex are used, where the range from 1.3 to 2.2 dtex is according to the invention preferable. If carding methods are used, the preferred cut lengths of the fibers are in the range of 35 to 60 mm, particularly preferably 40 to 60 mm. The fiber maximum tensile force elongation of usable fibers is in the range of 130-580%.

The term "binder or melt fiber" refers to thermoplastic synthetic fibers which in comparison to other fibers present in the fiber mix are either at all meltable or can have a melting point that is at least 10° C. lower than the other thermoplastic fibers present in the fiber mix. Homogeneously structured binder fibers but also bi-component binder fibers can there be used. Such bi-component binder fibers are made of two different polymers, where the melting point of the one polymer is higher by at least 10° C. than that of a second polymer likewise present in the fibers. These polymers are there usually present as a core/sheath structure, where the material of the core has the higher melting point and the material of the sheath has the lower melting point, as a "side by side" structure or as a "sea-island-type".

Preferred according to the invention are bi-component binder fibers having a core/sheath structure.

The term "dry-laid method" denotes the production method for the cover sheets according to the invention. The cover sheets according to the invention are produced following a conventional dry-laid method which is known to those skilled in the art. Preferred according to the invention is the carding method using staple fibers. The invention is in the following description described in more detail using non-wovens produced by way of carding methods. However, it should be understood that also any other known dry-laid method can be used instead of the carding method.

The term "hydroentanglement (water-jet bonding)" denotes a bonding method for the cover sheets of the invention. In this method, the entanglement of fiber and spunbonded non-wovens is done with water jets. The basic techniques of water-jet bonding are described, for example, in the book "Vliesstoffe", published by Wiley VCH, $2^{nd}$ ed., 2012, pages 340-359.

The term "thermal bonding" refers to a bonding method for non-wovens in which a meltable component within the fiber mixture contributes with the aid of heat to the bonding process by melting and subsequent cooling. Preferred according to the invention is hot air bonding—also referred to as thermofusion—which it is dry bonding that requires the presence of thermoplastic fibers. The respective method is described, for example, in the book "Vliesstoffe", published by Wiley VCH, $2^{nd}$ ed., 2012, pages 375-382. It is important that the non-woven is rapidly brought to the melting temperature of the melting/binding fiber and that the air flow is throttled once the temperature is reached, whereby the volume of the non-woven is maintained. Cooling is then done to largely rule out any possible shrinkage of the binder fibers and related thereto the decrease in thickness of the non-woven.

It is in this context to be noted that thermal bonding differs from thermal calender bonding. The difference between thermal bonding and thermal calender bonding lies in the fact that thermal bonding can do without a calender, i.e. without pressure or compression treatment in which fibers are welded together. With calender bonding, the thermal bond is achieved only at defined embossments. In thermal bonding in contrast, homogeneous bonding arises throughout the non-woven structure due to the uniform distribution of the binder fibers in the fiber mixture and therefore later in the non-woven.

BRIEF DESCRIPTION OF THE SEVERAL VIEWS OF THE DRAWINGS

In the following, the invention is explained in more detail using embodiments with reference to the appended drawings, where:

FIG. 1 shows the force-elongation behavior of differently produced non-wovens under tensile stress in the machine direction (MD=machine direction), where curves 1-3 represent comparative examples and curves 4 to 5 show examples according to the invention.

FIG. 2 shows the force-elongation behavior of differently produced non-wovens under tensile stress transverse to the machine direction (CD=cross direction). The materials used in the individual curves correspond to the materials of FIG. 1.

DETAILED DESCRIPTION OF THE INVENTION

The present invention is further explained by use of different fiber mixtures, both mixtures according to the invention as well as also comparative mixtures, and process settings. The individual fiber mixtures and their properties are specified in Table 1 below.

The following fiber mixtures were examined in more detail as part of this embodiment:

Sample 1: Comparative Example hydroentangled (water-jet bonded) non-woven, 25 g/m$^2$
fiber: 50 wt % polypropylene fibers 1.3 dtex/40 mm and 50 wt % polypropylene fibers 2.2 dtex/40 mm,
water-jet bonded Sample 2: Comparative Example thermally bonded non-woven, 25 g/m$^2$
fiber: 100 wt % bi-component fibers, 2.2 dtex/40 mm, where the sheath is made of polyethylene having a melting point of approx. 128° C. and the core is made of polypropylene having a melting point of approx. 165° C.
hot air bonded Sample 3: Comparative Example fiber: 50 wt % bi-component fibers, 2.2 dtex/40 mm, where the sheath is made of polyethylene having a melting point of approx. 128° C. and the core is made of polypropylene having a melting point of approx. 165° C., and 50 wt % polypropylene fibers 1.3 dtex/40 mm
water-jet and hot air bonded Sample 4: Example According to the Invention fiber: 45 wt % polypropylene fiber, 1.3 dtex/40 mm, 40 wt % polypropylene fibers 2.2 dtex/40 mm and 15 wt % bi-component fiber, 2.2 dtex/40 mm, where the sheath is made of polyethylene having a melting point of approx. 128° C. and the core is made of polypropylene having a melting point of approx. 165° C.,
water-jet and hot air bonded Sample 5: Example According to the Invention fiber: 45 wt % polypropylene fiber, 1.3 dtex/40 mm, 45 wt % polypropylene fibers 2.2 dtex/40 mm and 10 wt % bi-component fiber, 2.2 dtex/40 mm, where the sheath is made of polyethylene having a melting point of approx. 128° C. and the core is made of polypropylene having a melting point of approx. 165° C.,
water-jet and hot air bonded For the samples containing the bi-component fibers, it must be ensured in the production that the non-woven has for activating or melting the bi-component fibers already been dried in the dryer.

The temperatures in the belt dryer in the first zones are therefore below the activation temperature, so that only drying is preformed and the activation of the bi-component fibers is triggered only in the last part of the dryer, in a region of approx. 30%.

Exemplary temperatures are given below.
Temperature dryer zone 1: 116° C.
Temperature dryer zone 2: 102° C.
Temperature dryer zone 3: 96° C.
Temperature dryer zone 4: 130° C.

In a three-drum dryer, the first two drums are commonly used for drying and the bi-component fibers are in analogy to the belt dryer activated in the last drum.

After production, the individual non-wovens were subjected to the following test methods to obtain the data given in Table 1 below.

In the context of the tests, the term "longitudinal", "longitudinal direction" or "MD" is used to specify the orientation of a sample in the direction of production of the material or the machine direction, respectively. The terms "transverse", "cross direction" or "CD" indicate the orientation of the sample transverse to the direction of production of the material. Unless otherwise indicated, a sample width of 50 mm with a clamped length of 100 mm and a peel rate of 500 mm per minute was chosen for the tensile tests to simulate the width of a diaper ear.

Grammage: according to WSP 130.1, specified in g/m²

Thickness: according to WSP 120.6, determined at gauge pressure 0.5 kPa, specified in mm Maximum force Fmax longitudinal/transverse: according to WSP 110.4, option A, specified in N/50 mm Elongation at Fmax longitudinal/transverse: according to WSP 110.4, option A, specified in %

Elongation at 5N longitudinal/transverse: according to WSP 110.4, option A, in %, automatic determination of elongation when reaching a force of 5N in the tensile test Fiber elongation at fracture: according to ISO 5079, specified in %

Width contraction: it is determined as the ratio of the width B0 of a non-woven web in the unloaded state lying flat on a table to the width B1 of the same non-woven web when the latter is loaded with a tension of 10N. To determine the width under force, a non-woven sample 150 cm long and 20 cm wide is first fixed at the upper end of a test setup such that at least a piece of non-woven 120 cm long can hang down freely. It is there fixed such that the non-woven web is held across the entire width. A mass element is then attached at a distance of 110 cm from the upper clamping and fixed across the entire web width so that a force of 10N/20 cm arises at the non-woven web. Width B1 of the non-woven web is then again determined at a distance of 55 cm from the upper clamp. The width contraction is then obtained according to the following formula:

$$\text{width contraction } (\%) = 100 - \left(\frac{B1}{B0} \cdot 100\%\right)$$

Table 1 in addition to the non-wovens of the invention also shows non-wovens according to prior art, i.e. a purely hydroentangled non-woven and a purely hot air bonded non-woven.

Curve 1 in FIGS. 1 and 2 there schematically shows a conventional force-elongation curve of a hydroentangled bonded non-woven, initially almost linear with the lowest inclination, shortly before reaching the maximum force then with a progressive curve profile.

Curve 2 in FIGS. 1 and 2 shows the typical force-elongation curve of a non-woven purely bonded by way of hot air, i.e. a linear profile with greater inclination until the highest tensile force is reached, followed by a fracture of the sample.

The hydroentangled non-woven, in particular in the transverse direction, see FIG. 2, at the beginning of the force shows less inclination of the curve as compared to the hot air bonded non-wovens shown in curve 2, but which then rises almost exponentially with further elongation. The reason for this is knot formation among the individual fibers in the fiber entanglement points. This effect is positive for usage, since the user likewise perceives this behavior at the diaper ear so that overstretching can during use be prevented.

The fiber entanglements are in a hydroentangled non-woven not rigidly fixed, but are movable within themselves since the fibers are three-dimensionally entangled with each other. The fiber entanglements are there given uniformly over the entire surface of the non-woven. If a mechanical tensile force acts upon a non-woven of this kind, then the fibers entangled with each other can adapt over a wide part of this force without a noticeable increase in force and without the fiber entanglements disintegrating. The structural integrity of the non-woven is not lost.

This movable fiber entanglement points, however, are disadvantageous during the production and the further processing of such non-wovens due to the high sensitivity to tensile forces acting in the longitudinal direction associated therewith. Tensile forces in the longitudinal direction lead to width contractions that in part amount to above 20%, as indicated in Table 1, sample 1.

According to the present invention, binder fibers are used in addition to the hydroentangled staple fibers, whereby the fiber entanglement as well as the unbonded fibers in the fiber composite are fixed such that the resulting non-woven of the invention is, firstly, adapted to the force elongation behavior of non-woven that is only bonded by water jet, and secondly, insensitive to processing influences in the longitudinal direction, i.e. the width contraction of a non-woven according to the invention is marginal.

Since the drying process following the hydroentanglement is not only used to remove excess water, but also serves to activate the binder fibers contained in the fiber mixture and thereby leads to thermal bonding of the non-woven, the method can be performed in a cost-efficient manner because no additional process steps nor temporal elongation of the method are necessary.

Samples 2 to 5 shown in Table 1 each contain different proportions of binder fibers in the fiber mixture.

A non-woven that is thermally bonded consisting purely of binder fibers does exhibit good mechanical resistance to tensile forces—the width contraction is at 0.8%—but the maximum tensile forces and the related elongations, however, are too low. Furthermore, the material is too hard for use in hygiene products.

Due to the admixture of a binder fiber component according to the invention, which results in additional thermal bonding in the drying process of the hydroentanglement, an additional binding mechanism acts upon the non-woven. This results in the normally very extensible structure of a non-woven that is bonded purely by water jet being blocked or locked.

As is evident from the examples of sample 3 and in particular of samples 4 and 5 according to the invention, the melt fiber binding points are relatively brittle for which reason they fracture even with a low mechanical load and accordingly already at elongations between 30-70%.

Due to combining the two bonding methods water jetting and hot air, a superposition from a technological perspective of the force-elongation curves occurs. The mechanical stability of the non-woven in the longitudinal direction and hence its processability is thereby improved without the properties in the transverse elongation in the functional region deteriorating.

The behavior of a respective non-woven containing binder fibers is shown in curves 3 to 5 of FIGS. 1 and 2. It is clear that the curve profile in the lower elongation region can be "set" via the weight proportion of the binder fibers and adapted according to demands.

Since the strengths in a staple fiber non-woven, regardless of the bonding technology, largely follow the fiber direction, for example, 4.0-4.5/1 fiber orientation MD/CD indicates a similar strength ratio, the admixture of bi-component fibers also acts preferably in the machine run direction, i.e. exactly where more stability in terms of process technology is needed, while the functional properties in the CD direction are not adversely affected.

The functional properties are essentially limited to:
1. the force/elongation profile in the transverse direction, where an elongation as high as possible is required at a 5 and 10 N/5 cm force
2. furthermore, final strength of 15N/5 cm are demanded.

As can be seen from Table 1, the comparative example according to sample 3 exhibits a transverse strength of 11N/50 mm, i.e. a transverse strength which corresponds to prior art. The elongation in the transverse direction at 5N force is at 39% insufficient as compared to sample 1. Also the grip is due to the proportion of binder fibers of 50 wt % too hard for the intended purpose of use.

Samples 4 and 5 according to the invention comprise a significantly reduced proportion of binder fibers so that the number of bonding points existing in the non-woven can be significantly reduced. In particular the binder fiber content in sample 4 amounts to 15 wt % and in sample 5 to 10 wt %. Further tests have in this context demonstrated that a binder fiber content of up to 25 wt % yields results that satisfy the desired objectives.

The force-elongation curve of sample 4 is shown in the figures as curve 4. It has in particular shown that the material is with respect to the elongation behavior in the transverse direction, cf. FIG. 2, ideal for the intended use as cover sheet material. In the lower region of the force, almost no force builds up, only toward the end of the elongation force does the force increase rapidly so that the desired stop function is obtained. Sample 4 exhibits an Fmax-elongation in the transverse direction of 200% which corresponds to the level of sample 1 which is only water-jet bonded.

However, increasing the binder fiber content to about 25 wt % is detrimental to the grip, so that this proportion of binder fibers was set as the upper limit.

In sample 5, shown as curve 5 in FIGS. 1 and 2, the proportion of binder fibers was further reduced. The curve closely approximates curve 1, i.e. the sample that is only hydroentangled, so that further reduction of the binding fiber content increasingly corresponds to the purely hydroentangled non-woven. In has in this context shown that a binder fiber content of 5 wt % represents a lower limit for a non-woven according to the invention.

It has with respect to the width contraction at the processing force of approximately 10N in the longitudinal direction shown that sample 4 with a width contraction of 2.4% exhibits very good longitudinal stability without developing an excessive increase with cross elongation. Sample 5 exhibits a width contraction of 5.1%, i.e. a value still being acceptable, and has an F/E curve which almost corresponds to that of sample 1, in particular in relation to the transverse direction.

Non-wovens produced according to the invention, i.e. non-wovens in the weight range of 15-40 g/m$^2$, containing a content of 5-25 percent by weight of binding fibers and in which hydroentanglement is performed with subsequent thermal bonding by way of hot air, meet requirements a. to h. defined at the outset for extensible cover sheet materials.

Non-wovens thus produced according to the invention are suitable in particular as cover sheet materials for elastic closure systems since they meet all demands of the aforementioned requirement profile over prior art.

TABLE 1

|  | Sample 1: comparative example (prior art) | Sample 2: comparative example (prior art) | Sample 3: comparative example | Sample 4: example acc. to the invention | Sample 4: example acc. to the invention |
|---|---|---|---|---|---|
| type of bonding | water jet | thermal | water jet/thermal | water jet/thermal | water jet/thermal |
| content of binder fibers (wt %) | 0 | 100 | 50 | 15 | 10 |
| grammage (g/m$^2$) | 25.1 | 26.4 | 25.9 | 25.6 | 26.4 |
| thickness (mm) | 0.56 | 0.49 | 0.70 | 0.48 | 0.52 |
| Fmax MD (N/50 mm) | 48 | 19 | 72 | 65 | 64 |
| Fmax CD (N/50 mm) | 17 | 11 | 21 | 20 | 19 |
| width contraction at 1 kg load (%) | 22.2 | 0.8 | 1.4 | 2.4 | 5.1 |
| elongation at Fmax MD (%) | 70.0 | 22 | 25 | 51.0 | 63.5 |
| elongation at Fmax CD (%) | 187.0 | 46.0 | 115.0 | 200.0 | 194.0 |
| elongation at 5N CD (%) | 115 | 18 | 39 | 104 | 105 |
| elongation at 5N MD (%) | 10 | 7.9 | 1.67 | 3 | 6.9 |

The invention claimed is:

1. An extensible non-woven bonded by hydroentanglement and thermal processes,
   wherein the non-woven has a weight range from 15 to 40 g/m$^2$ and comprises:
   10 to 20 wt % of binder fibers of 2.2 dtex/40 mm, wherein binder fibers are formed of a thermoplastic material,
   40 to 45 wt % of first staple fibers of 1.3 dtex/40 mm, and
   40 to 45 wt % of second staple fibers of 2.2 dtex/40 mm,
       wherein the first staple fibers and the second staple fibers are thermoplastic fibers, and wherein the binder fibers have a melting point that is at least ten degrees Celsius lower than the first staple fibers and the second staple fibers.

2. The extensible non-woven according to claim 1, wherein the binder fibers are staple fibers.

3. The extensible non-woven according to claim 1, wherein the binder fibers are bi-component fibers comprising a sheath/core structure, wherein a sheath of the sheath/core structure has a melting point that is at least ten degrees Celsius lower than the melting point of a core of the sheath/core structure.

4. A process for producing the extensible non-woven according to claim 1, the process comprising:
- blending first staple fibers, second staple fibers, and binder fibers,
- carding the first staple fibers, the second staple fibers, and the binder fibers to produce a non-woven, and
- performing hydroentanglement and subsequently drying with hot air to remove excess water,
- wherein the binder fibers are made of the thermoplastic material and activated and thermally consolidated during drying, and
- wherein the non-woven has a weight range of 15-40 g/m$^2$ and comprises:
  - 10-20 wt % the binder fibers of 2.2 dtex/40 mm,
  - 40-45 wt % the first staple fibers of 1.3 dtex/40 mm,
  - 40-45 wt % the second staple fibers of 2.2 dtex/40 mm.

5. An elastic multi-layer laminate for use in an elastic component for personal hygiene products composed of elastic base material covered on one or both sides by a cover material, wherein the cover material is formed from the extensible non-woven according to claim 1.

* * * * *